J. C. KUBLY.
SWINGLETREE CLIP.
APPLICATION FILED MAY 7, 1915.
1,240,983.
Patented Sept. 25, 1917.
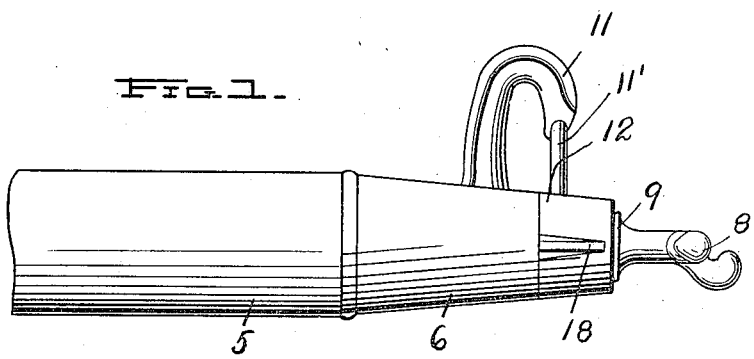
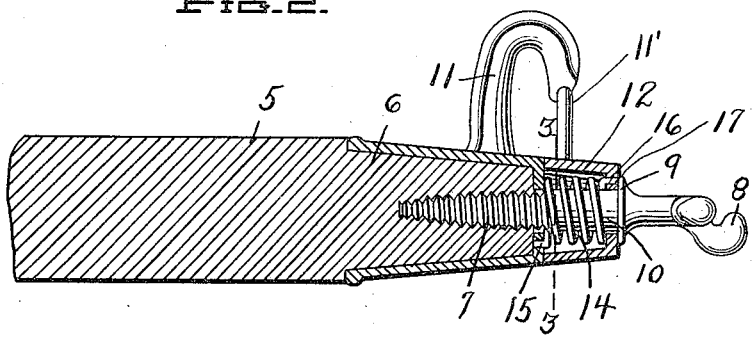
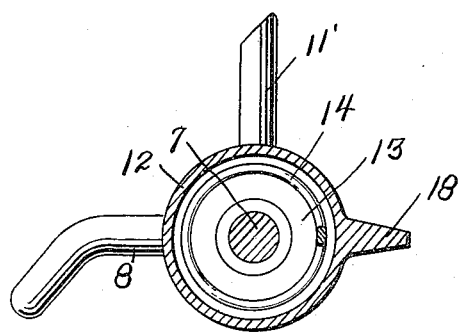
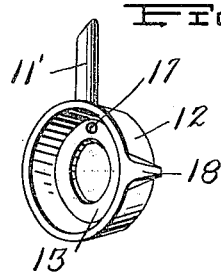
Witnesses
Arthur K. Moore
J. D. Ratcliffe
Inventor
J. C. Kubly
By Chandler & Chandler
Attorneys

UNITED STATES PATENT OFFICE.

JOHN CLARENCE KUBLY, OF MONROE, WISCONSIN.

SWINGLETREE-CLIP.

1,240,983.      Specification of Letters Patent.      Patented Sept. 25, 1917.

Application filed May 7, 1915. Serial No. 26,627.

*To all whom it may concern:*

Be it known that I, JOHN CLARENCE KUBLY, a citizen of the United States, residing at Monroe, in the county of Green, State of Wisconsin, have invented certain new and useful Improvements in Swingletree-Clips; and I do hereby declare the following to be a full, clear, and exact description of the invention, such as will enable others skilled in the art to which it appertains to make and use the same.

This invention relates to tug fasteners for swingletrees and it has for its object to provide in connection with an end ferrule having a hook for engagement with the end link of a trace chain or the cock-eye of a heavy leather work-trace, a fastening screw of such form that it will have the added function of engaging the eye of a light driving harness when desired. Thus the ferrule retaining member has a dual function.

Figure 1 is a side elevation of a whiffletree provided with the improved fastening means.

Fig. 2 is a vertical longitudinal sectional view through the structure shown in Fig. 1.

Fig. 3 is a transverse sectional view taken on the line 3—3 of Fig. 2.

Fig. 4 is a perspective view of the tongue member of the hook which receives the metal eye of a tug strap.

Referring now more particularly to the accompanying drawing, 5 designates the end portion of a whiffletree, on which is secured the ferrule 6. The hook member for holding the trace of a driving harness comprises a screw shaft 7 threaded in the end of the whiffletree and carrying at its extremity the hook 8, this shaft being formed with an annular shoulder 9 adjacent the hook and with a cylindrical portion 10 inwardly of the shoulder.

The means for holding the usual metal cockeye carried at the end of a working harness tug comprises a hook 11 projecting from the ferrule 6 and a tongue 11' is provided to close this hook, and is carried on a sleeve 12 which loosely surrounds the shaft and has one end portion thereof closed at 13 and provided with a central bore bearing on the portion 10 of the screw shaft. This tongue is resiliently urged to closing position by a spring 14 which surrounds the shaft within the sleeve and which has one end laterally directed at 15 and engaged with the end of the ferrule, and has its other end laterally directed at 16 and engaged by a bore 17 in the said end 13 of the sleeve. This sleeve is held to have a proper rotatable movement by bearing of its end against the portion 10 as stated, and bearing of its inner edge against the ferrule 6. The screw shaft 7 thus holds the whole device in assembled relation, and by this arrangement of parts an exceedingly simple structure has been provided which lends itself to ready and cheap manufacture. The structure described forms an adjusting means for the tension exerted by the spring, in that the bore 17 may be engaged with the end 16 of the spring to give it any desired number of turns before the sleeve is moved to its innermost position on the shaft, when its rotation is thus limited by engagement of the tongue with the hook.

For manipulating the sleeve to move the spring tongue of the hook, a thumb piece 18 is formed thereon.

What is claimed is:

The combination with a swingletree, of a ferrule disposed thereon and provided with a trace-chain engaging hook, a screw disposed axially through the outer end of the ferrule and engaged in the swingletree, a sleeve rotatably mounted upon the screw and directly held thereby against the outer face of the ferrule, the sleeve having a keeper for the hook, a helical spring mounted upon the screw and having its ends engaged with the ferrule and sleeve respectively in position to hold the keeper yieldably active, the outer end of the screw beyond the sleeve being formed to engage and retain a trace interchangeably with the hook.

In testimony whereof, I affix my signature, in the presence of two witnesses.

JOHN CLARENCE KUBLY.

Witnesses:
   WINIFRED GARDNER,
   M. E. SOLBROA.